United States Patent
Wimmer

(10) Patent No.: US 8,827,359 B2
(45) Date of Patent: Sep. 9, 2014

(54) CONTROL ROD FOR AN ADJUSTABLE CLOSING ELEMENT OF A VEHICLE ROOF

(75) Inventor: Rudolf Wimmer, Neuried (DE)

(73) Assignee: WEBASTO AG, Stockdorf (DE)

(*) Notice: Subject to any disclaimer, the term of this patent is extended or adjusted under 35 U.S.C. 154(b) by 0 days.

(21) Appl. No.: 13/383,454

(22) PCT Filed: Sep. 16, 2010

(86) PCT No.: PCT/DE2010/001101
§ 371 (c)(1),
(2), (4) Date: Feb. 23, 2012

(87) PCT Pub. No.: WO2011/035763
PCT Pub. Date: Mar. 31, 2011

(65) Prior Publication Data
US 2012/0169092 A1    Jul. 5, 2012

(30) Foreign Application Priority Data
Sep. 24, 2009    (DE) .......................... 10 2009 042 954

(51) Int. Cl.
*B60J 7/057*    (2006.01)
(52) U.S. Cl.
USPC ........................................ 296/223
(58) Field of Classification Search
USPC .......................................... 296/216.01–224
See application file for complete search history.

(56) References Cited

U.S. PATENT DOCUMENTS

| | | | |
|---|---|---|---|
| 4,453,922 A * | 6/1984 | Glaser .............................. | 464/57 |
| 4,806,066 A * | 2/1989 | Rhodes et al. ................ | 414/729 |
| 5,054,846 A | 10/1991 | Simin et al. | |
| 6,073,995 A * | 6/2000 | Klein ........................ | 296/216.02 |
| 6,186,588 B1 * | 2/2001 | Tsuruo ........................... | 296/223 |
| 6,454,347 B2 * | 9/2002 | Lee et al. ........................ | 296/223 |
| 2003/0196508 A1 | 10/2003 | Uenaka et al. | |
| 2004/0201243 A1 | 10/2004 | Hasselgruber et al. | |
| 2008/0271824 A1 * | 11/2008 | Fujino et al. .................. | 148/598 |
| 2008/0277077 A1 | 11/2008 | Rockelmann et al. | |
| 2009/0145559 A1 | 6/2009 | Glasl et al. | |

FOREIGN PATENT DOCUMENTS

| | | |
|---|---|---|
| DE | 2345995 | 12/1973 |
| DE | 2937121 A1 | 9/1979 |
| DE | 8435809 | 7/1984 |
| DE | 3444947 | * 12/1984 |
| DE | 10014329 A1 | 3/2000 |
| DE | 202006013778 U1 | 11/2006 |
| DE | 102007021005 A1 | 4/2007 |

(Continued)

OTHER PUBLICATIONS

International Search Report dated Jan. 18, 2011 for PCT/DE2010/001101.
Gao, Weiguo, Foundations of Mechnical Engineering Materials (Translation), Jan. 2004, pp. 131-133.
First Office Action in Chinese Application No. 201080035728.8 dated Sep. 27, 2013 and English language translation of Examination Report therof.

(Continued)

*Primary Examiner* — Dennis Pedder
(74) *Attorney, Agent, or Firm* — Fitch, Even, Tabin & Flannery LLP

(57) ABSTRACT

The invention relates to a control rod for an adjustable closing element or a vehicle roof. The adjustable closing element is designed to selectively close a roof opening in a closing position or at least partly release same in further positions. The control rod is formed from a drawn steel spring wire.

5 Claims, 1 Drawing Sheet

(56) References Cited

FOREIGN PATENT DOCUMENTS

| DE | 102005028458 B4 | 10/2007 |
|---|---|---|
| EP | 0244110 A2 | 4/1987 |
| JP | 61-287816 A | 12/1986 |
| JP | 07309129 | 11/1995 |
| JP | 2008-520859 A | 6/2008 |
| JP | 2009-510295 A | 3/2009 |

OTHER PUBLICATIONS

Ishlinskiy, A.J., Großes Enzyklopädisches Lexikon, Polytechnisch, Scientific Publishers, ("Great Russian Encyclopedia"), Moscow, 1998, 4 pages (including translation).

Second Office Action issued in Application No. 201080035728.8 [English translation].

* cited by examiner

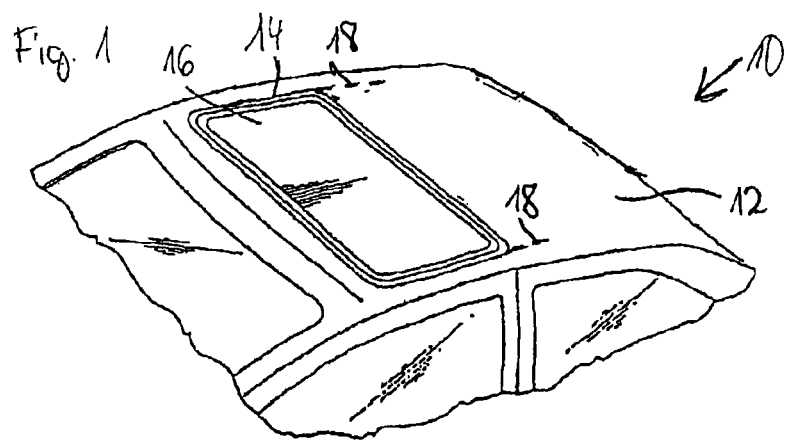
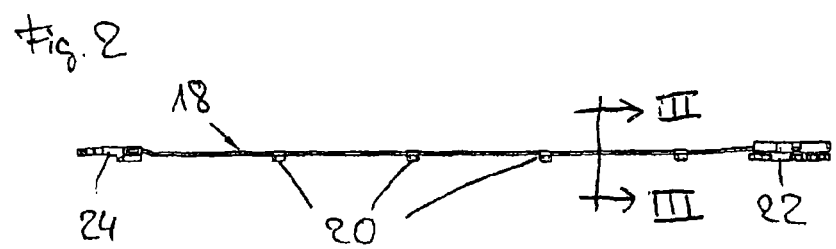

CONTROL ROD FOR AN ADJUSTABLE CLOSING ELEMENT OF A VEHICLE ROOF

CROSS-REFERENCE TO RELATED APPLICATIONS

This application is a U.S. national phase application filed under 35 U.S.C. §371 of International Application No. PCT/DE2010/001101, filed Sep. 16, 2010, designating the United States, which claims priority from German Patent Application No. DE10 2009 042 954.9, filed Sep. 24, 2009, which are hereby incorporated herein by reference in their entirety for all purposes.

The invention relates to a control rod for an adjustable closing element of a vehicle roof.

Control rods for use in closing elements of a vehicle roof and also for controlling other kinematic sequences may be made from steel sheets. The steel sheets may be stamped and bent to form a suitable shape and to fasten further elements such as sliding bodies and control elements. The stamping of steel sheets may require very complex stamping tools which may result in very high costs. Due to the high mechanical forces during the stamping process, the lifetime of the stamping tools may be very short. Thus the costs for stamping the steel sheets for producing the control rods may be very high.

The object of the invention is to provide a control rod for an adjustable closing element of a vehicle roof which permits reliable and accurate operation and is cost-effective to make.

This object is achieved by a control rod for an adjustable closing element of a vehicle roof. The adjustable closing element is designed to close a roof opening selectively in a closed position or open a roof opening at least partially in further positions. The control rod is formed from a drawn spring steel wire.

The adjustable closing element may, in particular, be a sliding roof panel, a tilting-sliding panel or a sliding screen.

An advantage of a control rod according to the invention is that the spring steel wire may already be available as a suitably configured semi-finished product. Thus it is no longer necessary to stamp the spring steel wire. The spring steel wire may be brought to a desired final shape in a simple manner by rolling, pressing, swaging and further forming methods. Thus a long lifetime of the tool for processing the spring steel wire may be achieved. Moreover, the material losses when producing the control rod are able to be kept low. As a result, only a low material consumption is required for the control rod. Thus, it is possible to produce a control rod in a cost-effective manner.

In an advantageous embodiment, the drawn spring steel wire is a square wire. The square wire may be bent in a particularly accurate manner. Moreover, the square wire may adopt a predetermined height and width in a simple manner by pressing or swaging.

Further advantageous embodiments of the invention are set forth in the sub-claims.

The invention is described in more detail hereinafter with reference to exemplary embodiments, in which:

FIG. 1 shows a perspective view of a vehicle roof, and
FIG. 2 shows a side view of a control rod and further parts of an adjustable closing element of the vehicle roof.
FIG. 3 is a cross-sectional view of the control rod taken along section lines III-III of FIG. 2.

Elements of the same construction or function have been denoted by the same reference numerals in all the figures.

A motor vehicle 10 comprising a vehicle roof 12 is shown in FIG. 1. The vehicle roof 12 forms part of the bodywork of the motor vehicle 10 and is provided with a roof opening 14.

The roof opening 14 may be selectively closed or partially opened by means of a closing element 16 which is displaceable in the region of the roof opening 14.

In the embodiment shown here the closing element 16 is a sliding roof panel which may be configured, for example, as a sliding roof panel which is guided internally or externally. In further embodiments of the vehicle roof 12, a tilting-sliding roof or a sliding screen may also be arranged instead of the sliding roof panel. The vehicle roof 12 may also comprise further sliding roof panels, tilting-sliding panels or sliding screens.

The adjustable closing element 16 is coupled to a control rod 18. The control rod 18 is coupled to sliding bodies 20. Moreover, relative to the motor vehicle 10, the control rod 18 is coupled to a rear control element 22 and a front control element 24.

The sliding bodies 20 may, for example, slide in a guide rail which is coupled to the vehicle roof 12. The guide rails may be arranged, in particular relative to the motor vehicle 10, laterally to the right and left of the roof opening 14. As the sliding bodies 20 slide in the guide rails, said sliding bodies are able to permit a movement of the control rod 18 in the longitudinal direction of the vehicle.

The rear control element 22 is preferably coupled to a control drive, by means of which the control rod 18 is displaceable in the longitudinal direction of the vehicle and a position of the control rod 18 is able to be fixed in the longitudinal direction of the vehicle.

The front control element 24 permits the control rod 18 to be coupled to the closing element 16. A relative movement of the closing element 16 in the longitudinal direction of the vehicle relative to the vehicle roof is achieved by guiding the control rod 18 in the guide rail of the vehicle roof 12. Due to this relative movement, the closing element 16 is able to be displaced and/or raised or lowered in the longitudinal direction of the vehicle, whereby the roof opening 14 is able to be closed or partially opened.

The control rod 18 is formed from a drawn spring steel wire. For a control rod 18 made of a drawn spring steel wire, no processing by stamping the spring steel wire is required. It is possible to bring the spring steel wire into the desired shape in a simple manner by rolling, pressing or swaging. Thus, by bending the spring steel wire said spring steel wire is able to adopt a path which is desirable for the control rod 18.

By pressing or locally rolling the spring steel wire, the control rod 18 is able to achieve a desired height and width at the desired points. Thus, in particular, the height or width of the control rod 18 is able to be locally reduced. By swaging the spring steel wire, at selected regions the control rod 18 is also able to maintain an enlarged cross section relative to the original spring steel wire.

In selected regions, the appropriate sliding bodies 20 and the rear control element 22 and the front control element 24 may be attached to the control rod 18.

The sliding bodies 20 may be coupled to the control rod 18, in particular by a suitable positive connection, for example by being screwed in or pushed on. Alternatively, the sliding bodies 20 may also be formed by injection-molding around the control rod 18 and connected thereto.

If the spring steel wire is processed by rolling, pressing or swaging, a long lifetime of the tool for processing the spring steel wire may be achieved. As no material-removing machining is required for the spring steel wire and thus no waste material has to be produced, by the use of the spring steel wire for the control rod 18 a very low material consumption for the control rod 18 may be achieved. Thus low costs may be achieved both for the material use and also for carrying out the method for producing the control rod 18.

By the use of tools for bending, rolling or pressing, moreover, a long lifetime of the tool for processing the spring steel wire may be achieved.

The drawn spring steel wire for the control rod 18 is, in particular, configured as square wire. A square wire may be bent or rolled in a very precise manner.

Moreover, by pressing or swaging the spring steel wire, a predetermined height and/or width of the spring steel wire and thus of the control rod 18 may be obtained in a simple manner.

The invention is not limited to the exemplary embodiments set forth. In particular, it is possible to combine the features of the various exemplary embodiments with one another so that such arrangements are also encompassed by the invention.

The invention claimed is:

1. An adjustable closing element of a vehicle roof, comprising a control rod assembly to close a roof opening selectively in a closed position or open said roof opening at least partially in further positions, wherein the control rod assembly has a drawn spring steel wire control rod, wherein the spring steel wire is pressed or locally rolled at predetermined points to locally reduce the height or width.

2. The adjustable closing element of a vehicle roof of claim 1, wherein the drawn spring steel wire control rod is a square wire.

3. The adjustable closing element of a vehicle roof of claim 1, wherein the control rod assembly is coupled to a plurality of sliding bodies.

4. A method to form a control rod assembly to close a roof opening selectively in a closed position or open said roof opening at least partially in further positions, the method comprising the steps of:
- pressing or rolling a spring steel wire to a predetermined height and width to form a control rod;
- attaching front control elements and rear control elements to the control rod;
- attaching a plurality of sliding bodies at predetermined points to the control rod; and
- pressing or locally rolling the spring steel wire at predetermined points to locally reduce its the height or width the spring steel wire is pressed or locally rolled at predetermined points to locally reduce the height or width.

5. A method to form a control rod assembly to close a roof opening selectively in a closed position or open said roof opening at least partially in further positions, the method comprising the steps of:
- pressing or rolling a spring steel wire to a predetermined height and width to form a control rod;
- attaching front control elements and rear control elements to the control rod;
- attaching a plurality of sliding bodies at predetermined points to the control rod; and
- swaging the spring steel wire at predetermined points to formed enlarged cross sections.

* * * * *